US011777736B2

United States Patent
Blackhurst et al.

(10) Patent No.: US 11,777,736 B2
(45) Date of Patent: Oct. 3, 2023

(54) USE OF BIOMETRICS AND PRIVACY PRESERVING METHODS TO AUTHENTICATE ACCOUNT HOLDERS ONLINE

(71) Applicant: Visa International Service Association, San Francisco, CA (US)

(72) Inventors: Jason Blackhurst, San Francisco, CA (US); Kim Wagner, Sunnyvale, CA (US); John F. Sheets, San Francisco, CA (US); Chunxi Jiang, San Francisco, CA (US); Sunpreet Singh Arora, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 93 days.

(21) Appl. No.: 16/635,909

(22) PCT Filed: Jul. 26, 2018

(86) PCT No.: PCT/US2018/043872
§ 371 (c)(1),
(2) Date: Jan. 31, 2020

(87) PCT Pub. No.: WO2019/032301
PCT Pub. Date: Feb. 14, 2019

(65) Prior Publication Data
US 2020/0228340 A1 Jul. 16, 2020

Related U.S. Application Data

(60) Provisional application No. 62/543,500, filed on Aug. 10, 2017.

(51) Int. Cl.
*H04L 9/32* (2006.01)
*H04L 9/00* (2022.01)
*H04L 9/08* (2006.01)

(52) U.S. Cl.
CPC ............ *H04L 9/3231* (2013.01); *H04L 9/008* (2013.01); *H04L 9/0866* (2013.01); *H04L 2209/46* (2013.01)

(58) Field of Classification Search
CPC ..... H04L 9/3231; H04L 9/008; H04L 9/0866; H04L 63/0861; H04L 2209/46
See application file for complete search history.

(56) References Cited

U.S. PATENT DOCUMENTS 9,935,947 B1 * 4/2018 Machani ............. H04L 67/1002
2007/0061590 A1 3/2007 Boye et al.
(Continued)

FOREIGN PATENT DOCUMENTS

CN 106797311 A 5/2017
WO 2016033499 A1 3/2016
(Continued)

OTHER PUBLICATIONS

PCT/US2017/024099, "International Application No.", Mar. 24, 2017, 63 pages.
(Continued)

*Primary Examiner* — Farid Homayounmehr
*Assistant Examiner* — Brian William Avery
(74) *Attorney, Agent, or Firm* — Kilpatrick Townsend & Stockton LLP

(57) ABSTRACT

Embodiments are directed to a method for securely performing biometric authentication online. The method described can be used to securely perform biometric authentication on a mobile device. For protecting the privacy of the users biometric data, a cryptographic comparison protocol can be used to perform matching of encrypted templates. For example, the cryptographic comparison protocol may involve Fuzzy Extractors (FE), Homomorphic Encryption (HE), and/or Secure Multi-Party Computation (SMPC).

14 Claims, 6 Drawing Sheets

(56) References Cited

U.S. PATENT DOCUMENTS

| | | | |
|---|---|---|---|
| 2014/0047529 A1 | 2/2014 | Pizano et al. | |
| 2014/0095884 A1 | 4/2014 | Kannavara et al. | |
| 2014/0115324 A1 | 4/2014 | Buer | |
| 2014/0195815 A1 | 7/2014 | Taveau et al. | |
| 2015/0019944 A1 | 1/2015 | Kalgi | |
| 2018/0167387 A1* | 6/2018 | Bhatt | H04L 63/10 |
| 2018/0191501 A1* | 7/2018 | Lindemann | H04L 9/0833 |
| 2018/0225506 A1* | 8/2018 | Lambert | G06K 9/6215 |

FOREIGN PATENT DOCUMENTS

| | | | |
|---|---|---|---|
| WO | 2017075063 | 5/2017 | |
| WO | WO-2017075063 A1 * | 5/2017 | G06F 21/32 |
| WO | 2018174901 | 9/2018 | |

OTHER PUBLICATIONS

PCT/US2018/043872, "International Preliminary Report on Patentability", dated Feb. 20, 2020, 7 pages.

U.S. Appl. No. 62/596,250, "U.S. Provisional Application No.", filed Dec. 8, 2017, 16 pages.

PCT/US2018/043872, "International Search Report and Written Opinion", dated Nov. 2, 2018, 12 pages.

EP18843485.6, "Extended European Search Report", dated Apr. 20, 2020, 9 pages.

Maltoni et al., "Securing Fingerprint Systems", Handbook of Fingerprint Recognition Springer, XP008122622, Jan. 1, 2009, pp. 371-416.

Velciu et al., "A Bio-Cryptographic Framework for Securing Mobile Devices Content", IEEE 11th International Symposium on Applied Computational Intelligence and Informatics (SACI), IEEE, XP032921231, May 12, 2016, pp. 37-42.

Velciu et al., "Methods of Reducing Bio-Cryptographic Algorithms Computational Complexity", IEEE 15th International Symposium on Computational Intelligence and Informatics (CINTI), IEEE, XP032731232, Nov. 19, 2014, pp. 153-158.

Application No. SG11202000218S, Written Opinion, dated Sep. 2, 2021, 7 pages.

Application No. SG11202000218S, Further Written Opinion, dated Sep. 5, 2022, 8 pages.

Application No. CN201880051439.3, Office Action, dated Jan. 10, 2023, 14 pages.

Velciu, et al., "A Bio-Cryptographic Framework for Securing Mobile Devices Content", 11th IEEE International Symposium on Applied Computational Intelligence and Informatics, May 12-14, 2016, Timisoara, Romania, p. 37-42, 6 pages.

\* cited by examiner

USE OF BIOMETRICS AND PRIVACY PRESERVING METHODS TO AUTHENTICATE ACCOUNT HOLDERS ONLINE

CROSS-REFERENCE TO RELATED APPLICATIONS

The present application is a U.S. National Stage of PCT/US2018/043872 filed Jul. 26, 2018, which claims the benefit of the filing date of U.S. Provisional Application No. 62/543,500, filed on Aug. 10, 2017, both of which are incorporated by reference in their entirety for all purposes.

BACKGROUND

In today's technological environment, it is common for users to carry around mobile electronic devices, such as smart phones and wearable devices. These mobile electronic devices are typically capable of receiving, sending, generating, and storing user data. As such, it is becoming increasingly popular for entities to accept digital records from mobile electronic devices. For example, it may be convenient for users to use their mobile phones to identify themselves rather than presenting an identification card. However, an issue may arise in that users want their records to be verified without exposing any sensitive information. For example, users want to avoid exposing their fingerprint, voice, and/or facial data to hackers that may intercept data messages.

Conventional systems for authenticating during online transactions typically user passwords. However, passwords are susceptible to being stolen. Biometric data is not used in online transactions because transmitting a user's biometric information could result in significant problems for the user since, unlike a password, the user cannot change his or her biometric information. Thus, conventional systems for authenticating during online transactions present drawbacks.

Embodiments of the invention address these and other problems, individually and collectively.

BRIEF SUMMARY

As explained above, mobile devices can be used to receive, send, generate, and store user data. However, in order to securely process sensitive information on a mobile device, it may be required for sensitive information to never be transmitted as clear text when communicated between devices and applications thereof. For example, if a user is to be identified using facial data generated at a mobile device, it should be ensured that the facial data cannot be stolen and used to by a criminal actor to pose as the user.

Embodiments of the invention described herein are directed to a method for securely performing biometric authentication online. The method described herein can be used by resource providers to authenticate users online during mobile device interactions. For example, the method can allow a merchant to identify a user when accepting payment credentials retrieved from the user's device. As such, the merchant may be confident that the purchaser is indeed the owner of the payment credentials and not a criminal in possession of the user's phone. Furthermore, the merchants can verify a user's identity without sensitive information of the user ever being exposed to a hacker.

One embodiment of the invention is directed to a method comprising, initiating, by a resource provider application on a mobile device, an authentication process for authenticating a user of a user device. The method may further comprise sending, by the resource provider application, a user identifier to an authentication gateway computer. The method may further comprise receiving, by the resource provider application, user enrollment information from the authentication gateway computer. In some embodiments, the user enrollment information may comprise an indication of enrollment. The method may further comprise obtaining, by the resource provider application, a biometric sample captured by the mobile device. The method may further comprise generating, by the resource provider application, an encrypted biometric template of the user from the biometric sample. The method may further comprise obtaining, by the resource provider application, an encrypted biometric enrollment template. In some embodiments, the encrypted biometric enrollment template is generated during an enrollment process conducted prior to the authentication process. The method may further comprise authenticating, by the resource provider application, the user based on comparing the encrypted biometric template to the encrypted biometric enrollment template utilizing a cryptographic comparison protocol. The method may further comprise executing, by the resource provider application, at least one operation in response to the user being authenticated.

Another embodiment of the invention is directed to a method comprising, obtaining, by the resource provider application on a mobile device, a biometric sample captured by the mobile device. The method may further comprise generating, by the resource provider application, a biometric authentication template of the user from the biometric sample. The method may further comprise obtaining, by the resource provider application, biometric matching information related to the biometric authentication template (e.g., a biometric enrollment template and/or an obfuscated matching circuit configured to provide an output from which a match between two biometric templates is identifiable). In some embodiments, the biometric matching information (e.g., the biometric enrollment template) is generated during an enrollment process conducted prior to the authentication process. The method may further comprise authenticating, by the resource provider application, the user based on the biometric authentication template, the biometric matching information, and a cryptographic comparison protocol. The method may further comprise executing, by the resource provider application, at least one operation in response to the user being authenticated.

Another embodiment of the invention is directed to a user device comprising: one or more biometric capture devices, one or more processors, and one or more memories comprising computer-executable instructions that, when executed by the one or more processors causes the user device to perform operations. The operations may comprise initiating, by a resource provider application on a mobile device, an authentication process for authenticating a user of a user device. The operations may further comprise sending, by the resource provider application, a user identifier to an authentication gateway computer. The operations may further comprise receiving, by the resource provider application, user enrollment information from the authentication gateway computer. In some embodiments, the user enrollment information may comprise an indication of enrollment. The operations may further comprise obtaining, by the resource provider application, a biometric sample captured by the mobile device. The operations may further comprise generating, by the resource provider application, an encrypted biometric template of the user from the biometric sample. The operations may further comprise obtaining, by the resource provider application, an encrypted biometric enrollment template. In some embodiments, the encrypted biometric enrollment template is generated during an enrollment process conducted prior to the authentication process. The operations may further comprise authenticating, by the resource provider application, the user based on comparing the encrypted biometric template to the encrypted biometric enrollment template utilizing a cryptographic comparison protocol. The operations may further comprise executing, by the resource provider application, at least one operation in response to the user being authenticated.

Yet another embodiment of the invention is directed to a user device comprising: one or more biometric capture devices, one or more processors, and one or more memories comprising computer-executable instructions that, when executed by the one or more processors causes the user device to perform operations. The operations may comprise obtaining, by the resource provider application, a biometric sample captured by the mobile device. The operations may further comprise generating, by the resource provider application, a biometric authentication template of the user from the biometric sample. The operations may further comprise obtaining, by the resource provider application, biometric matching information related to the biometric authentication template (e.g., a biometric enrollment template and/or an obfuscated matching circuit configured to provide an output from which a match between two biometric templates is identifiable). In some embodiments, the biometric matching information is generated during an enrollment process conducted prior to the authentication process. The operations may further comprise authenticating, by the resource provider application, the user based on the biometric authentication template, the biometric matching information, and a cryptographic comparison protocol. The operations may further comprise executing, by the resource provider application, at least one operation in response to the user being authenticated.

In some embodiments, the cryptographic comparison protocol of the methods and/or user devices described above may include one or more of: secure multi-party computation, homomorphic encryption, and/or fuzzy extractors.

In some embodiments, the resource provider application operates on a user device or as an application on a web server.

In some embodiments, the biometric enrollment template may be obtained from at least one of: a credential-holder application (e.g., an authentication application) on the mobile device or from the authentication gateway computer.

In some embodiments, the biometric enrollment template and/or the biometric authentication template may be encrypted.

In some embodiments, the methods and/or the operations of the user devices discussed herein may further comprise initiating, by the resource provider application on a mobile device, an authentication process for authenticating a user of a user device. The methods/operations may further comprise sending, by the resource provider application, a user identifier to an authentication gateway computer. The methods/operations may further comprise receiving, by the resource provider application, user enrollment information from the authentication gateway computer, the user enrollment information comprising an indication of enrollment and/or one or more identifiers managed by a credential-holder computer (e.g., an authentication computer).

In some embodiments, an enrollment process may comprise initiating, by a credential-holder application (e.g., an authentication application) on the user device, an enrollment process for enrolling the user in an authentication program. The enrollment process may further comprise generating, by the credential-holder application, the biometric enrollment template of the user from biometric information obtained by the mobile device during the enrollment process, the enrollment process may further comprise associating, by the credential-holder application, the biometric enrollment template of the user to at least one of: the user identifier or an identifier of the one or more identifiers managed by the authentication computer. The enrollment process may further comprise storing, by the credential-holder application, the biometric enrollment template.

In some embodiments, the methods and/or the operations of the user devices discussed herein may further comprise requesting, by the resource provider application from the authentication gateway computer, the biometric enrollment template and receiving, by the resource provider application, the biometric enrollment template from the authentication gateway computer.

In some embodiments, the biometric enrollment template may be stored at the user device (e.g., a mobile device) and/or an credential-holder computer (e.g., an authentication computer) and/or a credential-holder application (e.g., an authentication application).

In some embodiments, the at least one operation comprises delivering access to a resource provided by a resource provider based on the user being authenticated.

In some embodiments, the user identifier identifies the user of the user device or an account of the user.

In some embodiments, sending, by the resource provider application, the user identifier to the authentication gateway computer causes the authentication gateway computer to request the user enrollment information from a credential-holder computer (e.g., an authentication computer).

In some embodiments, the credential-holder computer (e.g., an authentication computer) manages a mapping between the user identifier and at least one of: the user enrollment information or one or more identifiers managed by the credential-holder computer (e.g., an authentication computer).

DETAILED DESCRIPTION

Figure 1:
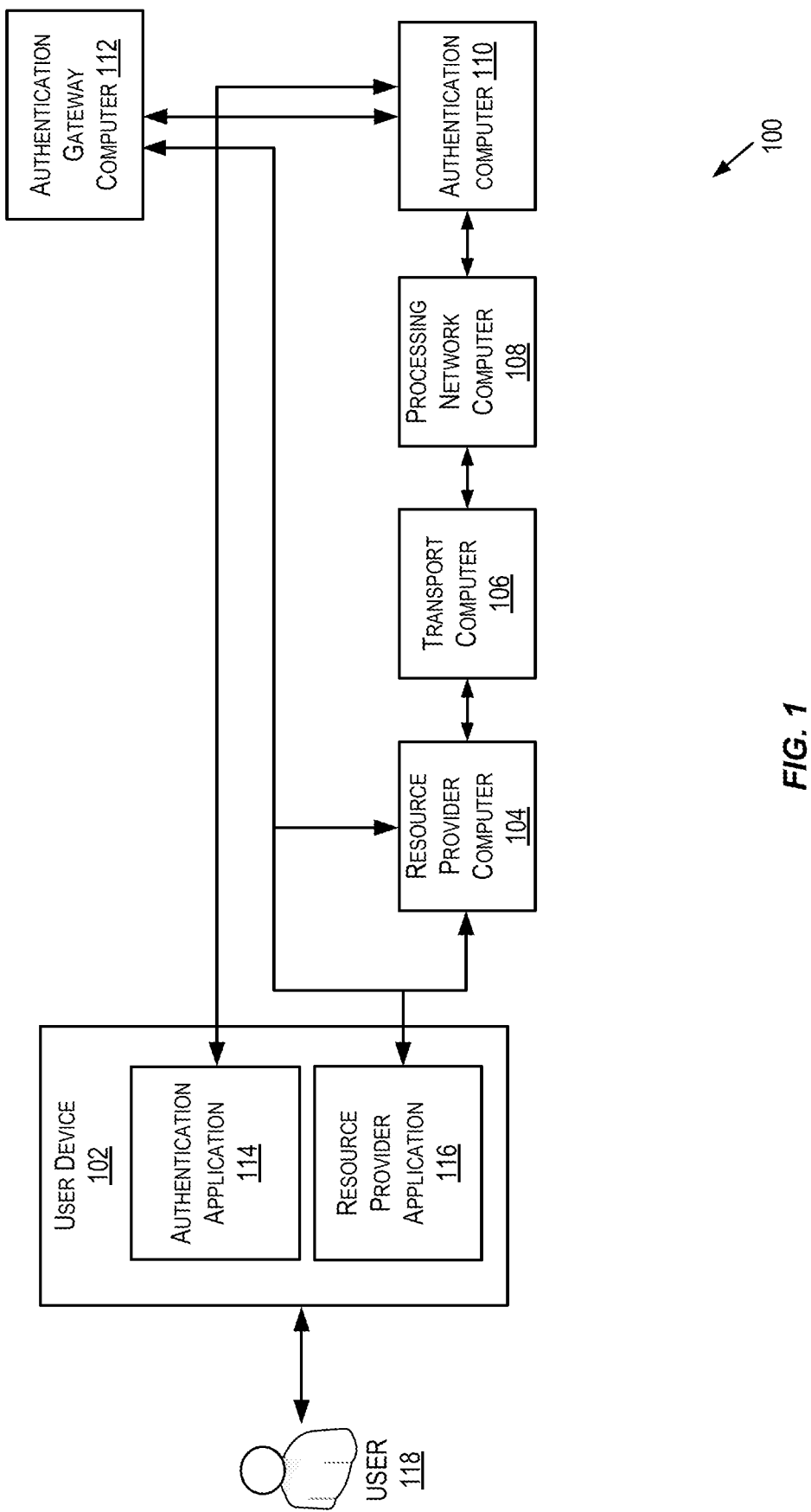
FIG. 1 shows a block diagram of a system for authenticating a user at a user device, according to some embodiments.

Embodiments are directed to a method for securely performing biometric authentication online. The method described can be used to securely perform biometric authentication on a user's device (e.g., a mobile device). For protecting the privacy of the user's biometric data, a cryptographic comparison protocol can be used to perform matching of encrypted and/or unencrypted biometric templates. For example, the cryptographic comparison protocol may involve Fuzzy Extractors (FE), Homomorphic Encryption (HE), and/or Secure Multi-Party Computation (SMPC).

One use case may involve a user having one or more wallet applications on his or her mobile phone and enrolling in a biometric authentication program. For example, the authentication program can be a provided service for conducting transactions using facial data (e.g. by generating a self-portrait or "selfie" using a front-facing camera) or other biometric data (e.g., a fingerprint, retina scan, etc.). Subsequently, the user may use resource provider application operating on their device, such as a mobile application or web application connected to a merchant server, so that the user may view items that he or she wishes to purchase and conduct a transaction. The resource provider application may provide a selection that allows the user to initiate an authentication, whereby the user can conduct the transaction by taking a picture of his or her face (or provide a biometric data corresponding to the type of biometric information provided at enrollment). The picture (or other biometric data) can then be compared to data for the self-portrait (or other biometric information) generated at enrollment. To compare the biometric data in a manner that preserves the privacy of the user, Fuzzy Extractors (FE), Homomorphic Encryption (HE), or Secure Multi-Party Computation (SMPC) may be implemented by the resource provider application. This may ensure that clear text data does not flow to and from the resource provider application during matching.

Before discussing detailed embodiments of the invention, some descriptions of certain terms may be useful.

A "computing device" may be any suitable device that can perform computations, and that can communicate with other devices. A mobile device is an example of a computing device. Other types of computing devices may not be mobile.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "user device" may comprise any electronic device that may be operated by a user, which may also provide remote communication capabilities to a network. A mobile device and/or a computing device may be examples of a user device.

An "authentication application" may be a software application (e.g., operating on a user device and hosted by a server) that is provided by an authorizing entity (e.g., a bank). In some embodiments, an authentication application may include wallet applications that may be software applications that may be provided to perform a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer. An "authentication computer" may be operated by, or on behalf of, an authorizing entity.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer."

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A "resource provider computer" may be any suitable computing device that may be operated by, or on behalf of, a resource provider.

A "processing network computer" may include a server computer used for processing network data. In some embodiments, the processing network computer may be coupled to a database and may include any hardware, software, other logic, or combination of the preceding for servicing the requests from one or more client computers. The processing network computer may comprise one or more computational apparatuses and may use any of a variety of computing structures, arrangements, and compilations for servicing the requests from one or more client computers. In some embodiments, the processing network computer may operate multiple server computers. In such embodiments, each server computer may be configured to process transaction for a given region or handles transactions of a specific type based on transaction data.

The processing network computer may include data processing subsystems, networks, and operations used to support and deliver authorization services, exception file services, and clearing and settlement services. An exemplary processing network computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The processing network computer may use any suitable wired or wireless network, including the Internet.

"Biometric data" is intended to refer to any suitable biological measurements. Examples of biometric data may include retina images, iris images, facial images, fingerprints, handprints, or an audio recording of a person's voice, etc. A "biometric sample" may include at least one instance of biometric data.

A "biometric template" is intended to refer to a digital reference of distinct characteristics that have been extracted from a biometric sample/biometric data. By way of example, a biometric sample may be utilized to extract unique features of the sample which may then be analyzed and converted into a mathematical file that is known as a biometric template. This template may no longer include the original biometric data as captured by the user device.

A "biometric authentication template" is intended to refer to a biometric template that was generated from biometric data (e.g., biometric sample(s)) provided during an authentication process conducted with a user device.

A "biometric enrollment template" is intended to refer to a biometric template that was generated from biometric data (e.g., biometric sample(s)) provided during an enrollment process conducted with a user device (or at least prior to initiation of an authentication process).

As described herein, "a fuzzy extractor" may correspond to a cryptographic comparison protocol used to generate cryptographic keys from biometric templates in a way that if the mechanism generates a particular cryptographic key from a first biometric template, the mechanism will generate an identical cryptographic key from a second biometric template so long as the second biometric template matches (i.e., is no necessarily identical to, but close enough to) the first biometric template. Cryptographic keys generated by a fuzzy extractor from two biometric templates may be compared to verify that two biometric templates match (e.g., are identical or at least similar over some threshold degree).

In some embodiments, a fuzzy extractor comprises two functions: a first fuzzy extractor function G and a second fuzzy extractor function R. G may take a biometric template $W\_D$ and map it to a pair of value $(R\_D, S\_D)$, where $R\_D$ is a secret cryptographic key and $S\_D$ is a public value that is needed for recreating $R\_D$ from any biometric template $W\_D'$ that matches $W\_D$. R take $W\_D'$ and $S\_D$ and maps them to a secret cryptographic key $R\_D'$, where $R\_D'$ is equal to $R\_D$ if $W\_D'$ matches W. Stated another way, the fuzzy extractor function G is used to generate a secret cryptographic key and a public value from a first biometric template while the second fuzzy extractor function R can re-generate the same secret cryptographic key from the same public value and a second biometric template as long as the first and second biometric templates match. Further details on fuzzy extractors can be found in an article entitle "Fuzzy Extractors; How to Generate Strong Keys from Biometric and Other Noisy Data," by Yegeniy Dodis, et al. SIAM Journal on Computing, 38(1):97-139, 2008. This reference is herein incorporated by reference in its entirety for all purposes.

"Homomorphic encryption" is intended to refer to a form of encryption that allows computation on ciphertexts, generating an encrypted result which, when decrypted, matches the result of the operations as if they had been performed on the plaintext. Thus, two encrypted biometric templates may be used to generate an encrypted result, that when decrypted, matches the result of the operations as if they had been performed on unencrypted biometric templates. Accordingly, encrypted results may be passed between devices and/or software applications and a receiving device may decrypt the encrypted result and use the encrypted and/or decrypted result for match verification purposes.

"Secure Multi-Party Computation (SMPC)" is used herein to refer an encryption mechanism that utilizes cryptographic techniques in order to enable multiple entities to jointly compute a function while keeping their inputs into the function private. Thus, in some embodiments discussed herein, two applications and/or systems may utilize two corresponding obfuscated biometric templates to jointly compute a function. This function (and/or function output) may then be used to verify that the encrypted biometric templates at each application/system match (or substantially match) while simultaneously enabling the biometric templates to remain private, or in other words, without having to exchange the biometric templates between the applications/systems.

For example, a first computing module (e.g., a device, an application) may determine an authentication function. The authentication function may implement a matching algorithm that can be configured to compare two templates (e.g., an biometric enrollment template and a biometric authentication template) and output an authentication result (e.g., match/no match, 90% likelihood of match, etc.) based on the comparison. In some embodiments, the authentication function may be transformed from a function F that takes two inputs to a function G that takes one input. The first computing module may then determine a circuit representing the function G. The first computing module may obfuscate the circuit by assigning one or more random values to each of the wires of the circuit. The first computing module may the send information associated with the obfuscated circuit to a second computing module (e.g., a different device or application). In some embodiments, the information may include obfuscated values associated with each logic gate in the obfuscated circuit, as well as information indicating how the logic gates in the obfuscated circuit are connected to each other.

The second computing module can evaluate the obfuscated circuit utilizing a second biometric template (e.g., a biometric authentication template) as input. In some embodiments, the biometric template may be obfuscated prior to being utilized as input for the obfuscated circuit. In some embodiments, the second computing module may send a request to the first computing module to translate the biometric authentication template into an obfuscated authentication template. This may cause the first computing module to initiate an oblivious transfer protocol. The oblivious transfer protocol may enable the first computing module to send the obfuscated authentication template in parts that are then received by the second computing module. Using the obfuscated authentication template, the second computing module may evaluate the obfuscated circuit to determine an obfuscated authentication result. The authentication result may be provided back to the first computing module. The transfer here is secure because an intermediary would not be able to derive any meaningful information based on intercepting the obfuscated authentication result. The first computing module may be configured to determine whether the user is authenticated based on the obfuscated result. By way of example, the first computing module may utilize stored mappings between obfuscated values a non-obfuscated values corresponding to wires of the obfuscated circuit. Based on the mapping(s), the non-obfuscated values associated with obfuscated values included in the obfuscated authentication result may be determined. The first computing module may determine the authentication result based on the determined non-obfuscated values.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. Systems

FIG. 1 shows a block diagram of a system 100 according to an embodiment of the invention. The system 100 includes a user device 102, a resource provider computer 104, a transport computer 106, a processing network computer 108, an authentication computer 110, and an authentication gateway computer 112. The user device 102 may be an example of a mobile device. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user device 102 may be in any suitable form. Example of user device 102 includes any device capable of accessing the Internet, such as a personal computer, cellular or wireless phones, personal digital assistants (PDAs), tablet computers, laptop computers, and handheld specialized readers. The user device 102 may transmit data through the communications medium.

The user device 102 may have any suitable characteristics. The user device 102 may include a processor and a computer readable medium coupled to the processor, the computer readable medium comprising code, executable by the processor for performing the functionality described herein. The user device 102 may be communicatively coupled to the resource provider computer 104 via a communications medium in order to exchange information with a resource provider associated with the resource provider computer 104. In some embodiments, the user device 102 may be in communications with a resource provider computer 104 through a resource provider application 116 operating on the user device 102 and hosted by the resource provider and/or resource provider computer 104. The user device 102 may be communicatively be coupled to authentication computer 110. In some embodiments, the user device 102 may be communicatively coupled to the authentication computer 110 via a communications medium in order to exchange information with an authorizing entity (e.g., a bank) associated with the authentication computer 110. In some embodiments, the user device 102 may be exchange data with the authentication computer 110 via an authentication application 114 operating on the user device 102. The authentication application (e.g., a wallet application) may be operated by, or on behalf of, an authorizing entity/authentication computer.

The resource provider computer 104 may include any suitable computational apparatus operated by a resource provider (e.g., a merchant). The resource provider computer 104 may include a processor and a computer readable medium coupled to the processor, the computer readable medium comprising code, executable by the processor for performing the functionality described herein. In some embodiments, the resource provider computer 104 may include one or more server computers that may host one or more websites associated with the resource provider (e.g., a merchant). In some embodiments, the resource provider computer 104 may be configured to send data to a processing network computer 108 via a transport computer 106 as part of a payment verification and/or authentication process for a transaction between the user (e.g., consumer) and the resource provider. The resource provider computer 104 may also be configured to generate authorization request messages for transactions between the resource provider and the user 118, and route the authorization request messages to an authentication computer 110 for additional transaction processing.

In some embodiments, the resource provider computer 104 may be accessed via an resource provider-operated website accessible to the user device 102. This website may be configured to be accessible from an application (e.g., a browser application, the resource provider application 116, etc.) operating on the user device 102.

The authentication computer 110 is typically associated with a business entity (e.g., a bank) which issues and maintains consumer accounts for a consumer. The authentication computer 110 may issue payment devices for the consumer account, including credit cards and debit cards, digital wallets, and/or may provide user accounts stored and accessible via the user device 102. In some embodiments, the authentication computer 110 may be configured to store credentials (e.g., user identifiers, biometric data, biometric templates, etc.) associated with a user account.

In some embodiments, the authentication computer 110 (or another computing system operated by or on behalf of an authorizing entity) may manage and provide services to the user 118 related to an online banking account. The services may be provided to the user via the authentication application 114 (e.g., a banking application, a digital wallet application, a web browser, etc.) and stored a user's computer device (e.g., the user device 102). The authentication computer 110 may send over-the-air (OTA) messages to an application (e.g., the authentication application 114) stored on the user device 102. In at least one example, the authentication computer 110 may be responsible for providing one or more network pages associated with an issuer entity. The authentication computer 110 may be accessed via an issuer-operated website accessible to the user device 102. This website may be configured to be accessible from an application (e.g., a browser application, the authentication application 114, etc.) operating on the user device 102. The authentication application 114 may be configured to receive and transmit digital wallet/banking data using one or more service calls. For example, the authentication computer 110 may be configured to handle service call requests from an application operating on the user device 102 (e.g., a browser application and/or the authentication application 114). The authentication computer 110 may serve, in response to received requests, various user interfaces that may be rendered at the user device 102 (e.g., via a browser application, the authentication application 114, etc.).

The authentication application 114 may be associated with a digital wallet account that can store user profile information, payment account information, bank account information, credentials (e.g., payment credentials, usernames/passwords, biometric data and/or templates, etc.), and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. In some embodiments, the authentication application 114 may be referred to as a "credential-holder application" and the authentication application 110 may be referred to as a "credential-holder computer."

In some embodiments, the user 118 may utilize the authentication application 114 to perform an enrollment process by exchanging data with the authentication computer 110. Through this enrollment process, the user may enroll/register so as to have the ability to be authenticated via biometric information provided by the user via the user device 102. An example process for enrollment is discussed further with respect to FIG. 2. During enrollment, the user 118 may be prompted to provide biometric data. This data may be analyzed and unique features may be extracted to generate a biometric enrollment template from the biometric data. The biometric enrollment template may be stored by the authentication application 114 at the user device 102, or the authentication application 114 may provide the biometric enrollment template to the authentication computer 110.

The transport computer 106 is typically associated with a business entity (e.g., a commercial bank) that has a business relationship with a particular resource provider (e.g., merchant) or other entity and that may be involved in the process of transaction. The transport computer 106 may issue and manage accounts for resource providers and exchange funds with the authentication computer 110 on behalf of the resource provider. Some entities can perform both authentication computer 110 and transport computer 106 functions. Embodiments of the present invention encompass such single entity issuer-acquirer computers. The processing network computer 108 may provide transaction authorization, and clearing and settlement services between the transport computer 106 and the authentication computer 110 for standard payment transactions.

The processing network computer 108 may be a network that includes or operates at least one server computer used for processing (e.g., payment processing). The server computer in the processing network computer 108 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the processing network computer 108 may operate multiple server computers. In such embodiments, each server computer may be configured to process transaction for a given region or handles transactions of a specific type based on transaction data.

The processing network computer 108 may include data processing subsystems, networks, and operations used to support and deliver authorization services, exception file services, and clearing and settlement services. The processing network computer 108 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The processing network computer 108 may process transaction request messages and determine the appropriate destination (e.g., authentication computer(s)) for the transaction request messages. The processing network computer 108 may also handle and/or facilitate the clearing and settlement of transactions.

In some embodiments, an authentication gateway computer 112 is provided. The authentication gateway computer 112 may be communicatively coupled with the authentication computer 110, the resource provider computer 104, and/or the resource provider application 116. The authentication gateway computer 112 may be configured to receive requests (e.g., from the resource provider computer 104 and/or the resource provider application 116) to verify enrollment of the user 118 in a biometric authentication program. In some embodiments, the authentication gateway computer 112 may be configured to request enrollment information (e.g., biometric enrollment template(s)) from the authentication computer 110 (or another suitable local/remote storage location). The authentication gateway computer 112 may be configured to provide enrollment information (e.g., biometric enrollment templates) to the user device (e.g., via the resource provider application 116). Example biometric authentication processes are discussed in further detail below with respect to FIGS. 3 and 4.

Figure 2:
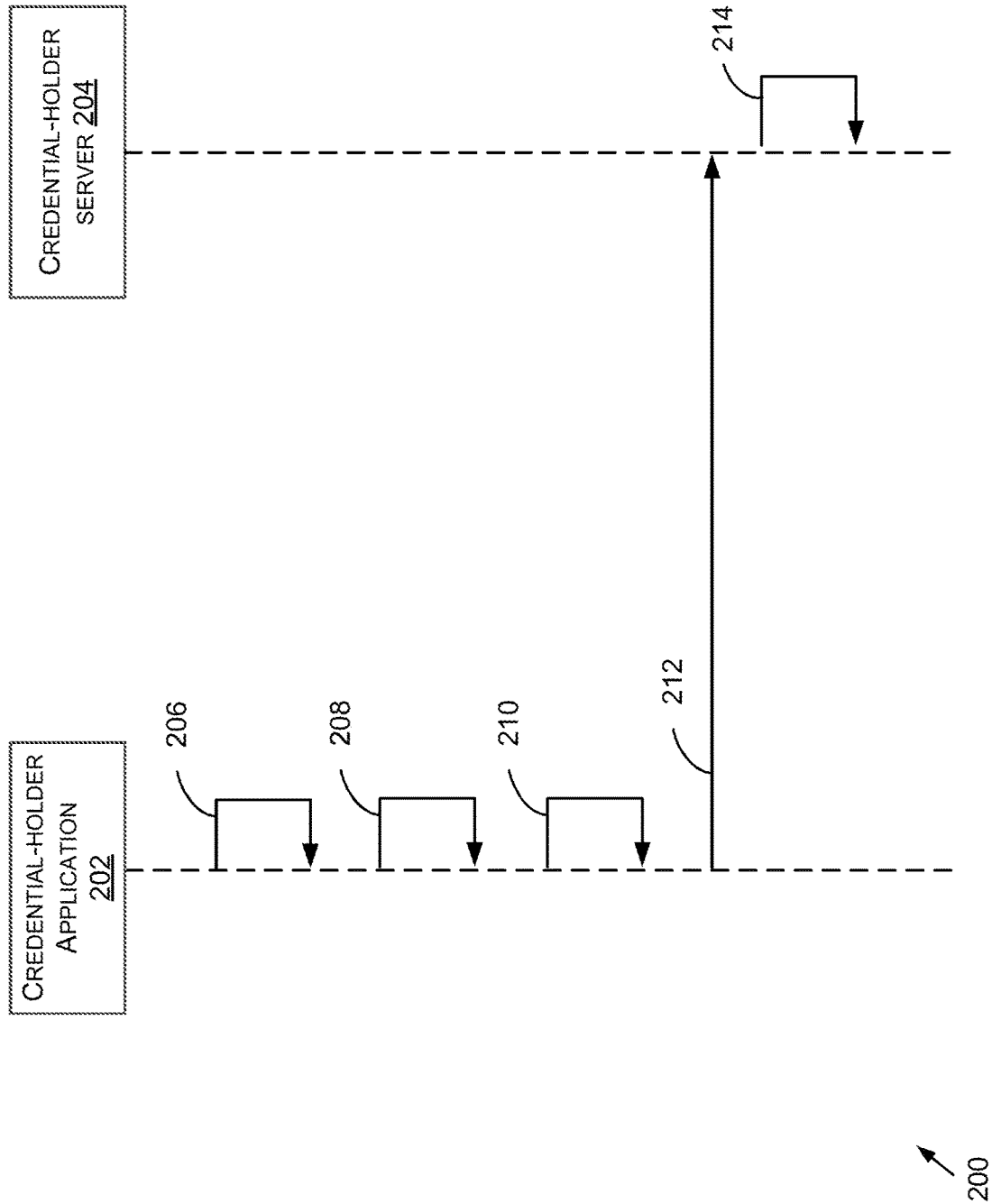
FIG. 2 shows a flow diagram of an enrollment process, according to some embodiments.

Beginning of FIG. 2

FIG. 2 shows a flow diagram 200 of an enrollment process, according to some embodiments.

According to embodiments, a user may use credential-holder application 202 to enroll into a biometric authentication program. Credential-holder application 202 may be any suitable application operation on a user device (e.g., the user device 102 of FIG. 1) that is configured to store one or more user credentials. Credential-holder application 202 may be an example of the authentication application 114 of FIG. 1. Although the enrollment process described in FIG. 2 is depicted as being performed by a credential-holder application and a credential-holder server 204 (e.g., an example of the authentication computer 110 of FIG. 1), it should be appreciated that enrollment information may include more, fewer, or different devices such as any suitable combination of the computing devices discussed above in connection with FIG. 1. As a non-limiting example, it may be the case that any suitable portion of enrollment data may be provided by the credential-holder application 202 and/or credential-holder server 204 to the authentication gateway computer 112 of FIG. 1 for storage and later processing.

At 206, the credential-holder application 202 may provide/display a selection to the user that can be used to indicate a request for enrollment into an authentication program. The credential-holder application 202 may receive the request and may initiate an enrollment process per instructions of enrollment module (e.g., the enrollment module 330 and/or the enrollment module 430 of FIGS. 3 and 4, respectively). To initiate the enrollment process, the credential-holder application 202 may first prompt the user to enter his or her biometric sample into his mobile device (e.g., the user device 102 of FIG. 1). For example, the credential-holder application 202 may prompt the user to use a front-facing camera to take a picture of his or her face. Other examples of biometric samples that may be entered into the mobile device may include samples of the user's voice, fingerprint, iris, etc.

Once the biometric sample of the user has been captured by the mobile device, a biometric template may be generated at 208 by the credential-holder application 202. For example, enrollment module may comprise instructions for generating a biometric template from the biometric sample of the user. In some embodiments, the enrollment module may comprise instructions for passing the biometric template through an encryption algorithm such that its data values may be obfuscated.

Once the biometric (enrollment) template has been generated (and potentially encrypted), the credential-holder application 202 may associate the biometric template to a user identifier and a credential-holder identifier at 210. Examples of user identifiers may include device IDs, account numbers, usernames, or any other unique identifier for the user of mobile device. Examples of credential-holder identifiers may include wallet IDs, mobile banking ID numbers, or any other unique identifier for credential-holder application 202. In one embodiment, an identifier for the biometric template may be generated, such that the identifier for the biometric template may be linked to the user identifier and the credential-holder application 202 in a memory storage or database.

According to embodiments, the biometric template generated during the enrollment process may be stored for later use. In one embodiment, the biometric template may be securely stored on the mobile device as encrypted biometric template data (e.g., the encrypted biometric template data 332 and 432 of FIGS. 3 and 4, respectively). In another embodiment, the encrypted biometric template may be stored at a remote server associated with credential-holder application 202, such as credential-holder server 204.

For example, at 212, an enrollment message comprising the encrypted biometric template and the associated user identifier and credential-holder identifier thereof may be transmitted to the credential-holder server 204. The credential-holder server 204 may then receive the enrollment message, store the encrypted biometric template, and link the encrypted biometric template to the user identifier and credential-holder identifier (e.g. in a relation database) at 214. In some embodiments, the encrypted biometric template may be stored partly on the user device (in a storage location accessible to the credential-holder application 202) and partly on the credential-holder server 204. For example, the encrypted biometric template may be represented as a string of bits or characters that can be divided into two or more portions. The two or more portions may then be stored separately at the user device (e.g., the user device 102 of FIG. 1) and the credential-holder server 204.

Once the user has successfully enrolled into the biometric authentication program, he or she may then authenticate him or herself to a resource provider online, according to the processes described below.

II. Methods

Figure 3:
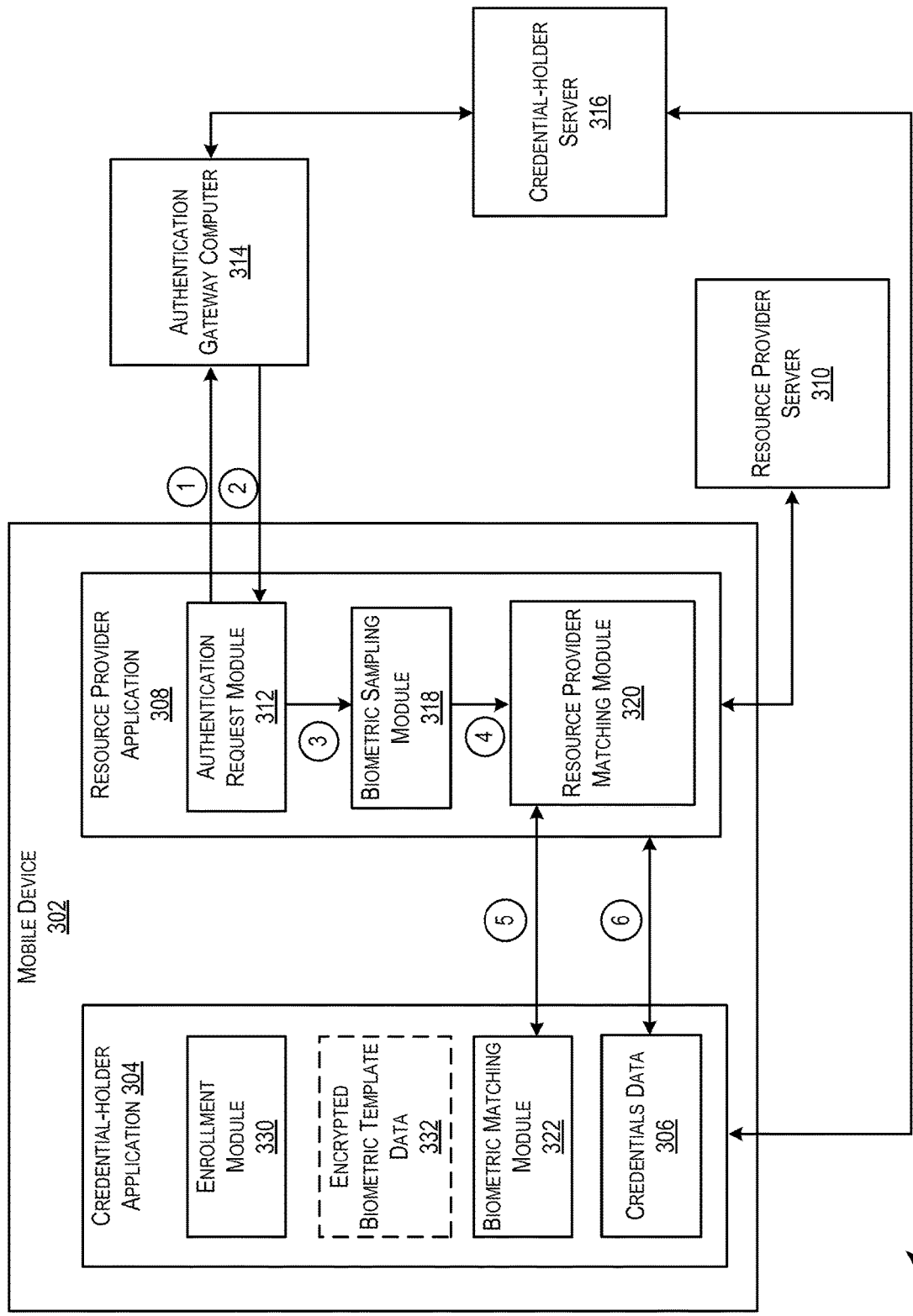
FIG. 3 shows a process block diagram for securely authenticating a user at an application operating a user device, according to some embodiments.

FIG. 3 shows a process flow diagram for securely authenticating a user at a resource provider application according to embodiments. System 300 may comprise a mobile device 302 of a user. The mobile device 302 may be an example of the user device 102 of FIG. 1. The mobile device 302 may be any mobile electronic device such as a mobile phone, wearable device, laptop, tablet, etc. System 300 may further comprise a credential-holder application 304 for storing credentials of a user. The credential-holder application 304 may be an example of the authentication application 114 of FIG. 1 and/or the credential-holder application 202 of FIG. 2. In some embodiments, credential-holder application 304 may be a digital wallet application or mobile banking application that may store user credentials such as payment credentials or tokens that can be used for payment. In one embodiment, user credentials can be securely stored at credential-holder application 304 as credentials data 306, and can be retrieved by mobile device 302 to conduct a transaction.

In some embodiments, the enrollment process described above in connection with FIG. 2 has been conducted prior to the authentication process described with respect to FIG. 3. Accordingly, the credential-holder application 304 may have access to the encrypted biometric template data 332 which may include an encrypted biometric enrollment template generated during the enrollment process by the enrollment module 330 in the manner described in FIG. 2.

In the embodiment depicted in FIG. 3, mobile device 302 may comprise a resource provider application 308 (e.g., the resource provider application 116 of FIG. 1). In one embodiment, the resource provider application 308 may be a mobile application that performs backend communications with a resource provider server 310 (e.g., the resource provider computer 104 of FIG. 1). For example, the resource provider application 308 may be a mobile application provided to users by a merchant, such that the users may interact directly with the merchant from their mobile device 302. In another embodiment, the resource provider application 308 may be a website or web application that may connect to resource provider server 310. For example, the user may use a web browser of mobile device 302 to connect to a merchant website that provides the functionalities of resource provider application 308.

With reference to FIG. 3, a user may first initiate an authentication process for conducting a secure interaction on mobile device 302. For example, a checkout/purchase page of resource provider application 308 may provide/display a selection to the user, allowing the user to request authentication for a payment transaction using the enrolled biometric authentication program (also referred herein as "the authentication program"). Upon selection by the user, the request may be received by authentication request module 312 to initiate the authentication process represented by steps 1 through 6 shown.

At step 1, a user identifier may be retrieved from mobile device 302 and sent to authentication gateway computer 314 (e.g., the authentication gateway computer 120 of FIG. 1). For example, a device ID or network address may be retrieved from the mobile application or webpage. As another example, a user ID or account number can be entered into mobile device 302 and forwarded to authentication gateway computer 314. In embodiments, authentication gateway computer 314 may be a dedicated server for routing messages in carrying out the biometric authentication process. In one embodiment, communications between the resource provider application 308 and authentication gateway computer 314 may be accomplished through one or more application program interfaces (API). For example, the resource provider application 308 may submit an API call for submitting the user identifier to authentication gateway computer 314 and receiving an appropriate response.

At step 2, the authentication gateway computer 314 may receive the user identifier and may determine enrollment information for the user that can then be sent back to resource provider application 308. In one embodiment, the user enrollment information may comprise an indication of the user's enrollment (e.g. Yes or No), and one or more credential-holder identifiers. In some embodiments, enrollment information is stored at the authentication gateway computer 314, while in other embodiments at least some portion of the enrollment information may be stored at the credential-holder server 316. In some examples, the authentication gateway computer 314 may call out to the credential-holder server 316 to determine if the user identifier is associated with a credential-holder identifier, and may further determine if the user identifier is associated with an enrolled biometric template (e.g., a biometric enrollment template). The authentication gateway computer 314 may then retrieve any credential-holder identifiers associated with the user identifier, and may send the credential-holder identifiers and an indication of enrollment to resource provider application 308. For example, authentication gateway computer 314 may send an API response comprising an enrollment indication (e.g. 'enrolled=true') and one or more identifiers (e.g., wallet identifiers) identifying one or more digital wallets storing credentials of the user.

At step 3, the resource provider application 308 may receive (e.g., via authentication request module 312) the user enrollment information, and may retrieve a biometric sample from the user. For example, the user enrollment information may comprise a positive indication of enrollment, which may initiate instructions of biometric sampling module 318. For example, the instructions may comprise code for prompting the user to provide a biometric sample via the mobile device 302. By way of example, the user may be prompted to take a self-portrait using a camera of the mobile device 302. The image data generated from the camera can then be used extract a biometric sample of the user's face. In other embodiments, other biometric reading devices such as microphones, fingerprint readers, etc. can be used by resource provider application 308 to retrieve a necessary biometric sample. Upon prompting by the resource provider application 308, the user may oblige to capturing his or her biometric sample, or may choose to cancel and terminate the authentication process.

At step 4, the successful capture of a biometric sample of the user may initiate a secure matching process. In embodiments, the secure matching process may be initiated and carried out using instructions of resource provider matching module 320. The instructions may comprise receiving the biometric sample of the user, generating a biometric template from the biometric sample, and encrypting the biometric template. For example, resource provider matching module 320 may comprise a biometric template derivation algorithm for extracting biometric features, and may comprise an encryption algorithm, for encrypting the biometric template data such that the extracted features may be obfuscated. Thus, in some examples, the resource provider matching module 320 may be configured to generate a biometric template from the biometric sample captured by the biometric sampling module 318. In some embodiments, the biometric template is encrypted by the resource provider matching module 320.

At step 5, resource provider application 308 may continue the secure matching process by retrieving the encrypted biometric template stored during enrollment of the user (e.g., the biometric enrollment template) into the authentication program. As previously discussed, the encrypted biometric template data 332 may include the biometric enrollment template generated during the enrollment process described above in connection with FIG. 2. The resource provider application 308 may determine the location of the encrypted biometric template data 332 based on the one or more credential-holder identifiers received from authentication gateway computer 314 in step 2. If there are two or more credential-holder identifiers, the resource provider application 308 may ask the user which credential-holder they wish to use. For example, the resource provider application 308 may determine one or more digital wallets storing the user's credentials data 306, and may present/display a selection to the user for selecting the wallet or credentials they wish to use for conducting the transaction with the resource provider. The resource provider application 308 may retrieve encrypted biometric template data 332 stored at credential-holder application 304 to perform the secure matching.

To protect the privacy of the user of mobile device 302 and his or her biometric data, matching of the biometric enrollment template to the biometric template generated at authentication may be performed using a cryptographic comparison protocol. The biometric matching module 322 may perform such cryptographic comparisons and/or the resource provider matching module 320 may be configured to perform these cryptographic comparisons. The cryptographic comparison protocol may allow for matching of the templates without transmitting any plaintext biometric data between credential-holder application 304, resource provider application 308, and/or credential-holder server 316. However, upon comparison, reliable information pertaining to the match result (match/no match) may be made available at all components of system 300. In embodiments, the cryptographic comparison may be accomplished by any one of: Secure Multi-Party Computation (SMPC), Homomorphic Encryption (HE), and/or Fuzzy Extractors (FE). More information regarding cryptographic comparison protocols can be found in International Patent Application Number: PCT/US17/24099 and International Patent Application Number: PCT/US16/58880, which are herein incorporated by reference in their entirety for all purposes. In addition, additional details relating to the cryptographic comparison protocols may also be described further below. In some embodiments, at least some of the cryptographic comparison protocols may utilize encrypted biometric templates.

As a non-limiting example in which a match is determined utilizing a cryptographic comparison protocol such as SMPC, a biometric matching module 322 may determine an authentication function. The authentication function may implement a matching algorithm that can be configured to compare two templates (e.g., an biometric enrollment template and a biometric authentication template) and output an authentication result (e.g., match/no match, 90% likelihood of match, etc.) based on the comparison. In some embodiments, the authentication function may be transformed from a function F that takes two inputs to a function G that takes one input. The biometric matching module 322 may then determine a circuit representing the function G. The biometric matching module 322 may obfuscate the circuit by assigning one or more random values to each of the wires of the circuit. The biometric matching module 322 may send information associated with the obfuscated circuit to the resource provider matching module 320. In some embodiments, the information may include further obfuscated values associated with each logic gate in the obfuscated circuit, as well as information indicating how the logic gates in the obfuscated circuit are connected to each other.

The resource provider matching module 320 may evaluate the obfuscated circuit utilizing the biometric authentication template as input. In some embodiments, the biometric authentication template may be obfuscated prior to being utilized as input for the obfuscated circuit. In some embodiments, the resource provider may send a request to the biometric matching module 322 to translate the biometric authentication template into an obfuscated authentication template. This may cause the biometric matching module 322 to initiate an oblivious transfer protocol. The oblivious transfer protocol may enable the biometric matching module 322 to send the obfuscated authentication template in parts that are then received by the resource provider matching module 320. Using the obfuscated authentication template, the resource provider matching module 320 may evaluate the obfuscated circuit to determine an obfuscated authentication result. The authentication result may be provided by the resource provider matching module 320 to the biometric matching module 322. The transfer here is secure because an intermediary would not be able to derive any meaningful information based on intercepting the obfuscated authentication result. The biometric matching module 322 may be configured to determine whether the user is authenticated based on the obfuscated result. By way of example, the biometric matching module 322 may utilize stored mappings between obfuscated values a non-obfuscated values corresponding to wires of the obfuscated circuit. Based on the mapping, the non-obfuscated values associated with obfuscated values included in the obfuscated authentication result may be determined. The biometric mapping module 322 may determine the authentication result based on the determined non-obfuscated values.

It should be appreciated that in some embodiments, the functions of the biometric matching module 322 may be provided by the resource provider matching module 322 and vice versa. Thus, in the example above, the resource provider matching module 322 may be configured to determine the obfuscated circuit and the matching result.

At step 6, if the comparison results in a positive match result (i.e. 'match=true'), then credentials data 306 may be retrieved and used to perform one or more operations. By way of example, the credentials data 306 may be utilized to authorize access to a resource provided by the resource provider. In another embodiment, the resource provider application 308 may further compare either the biometric enrollment template or the biometric template generated during the authentication process to a photo stored at the resource provider application 308 as an additional security check. For example, the resource provider application 308 may be a social media application that may be compare the biometric template generated at authentication to one or more photos of the user's social media profile.

Figure 4:
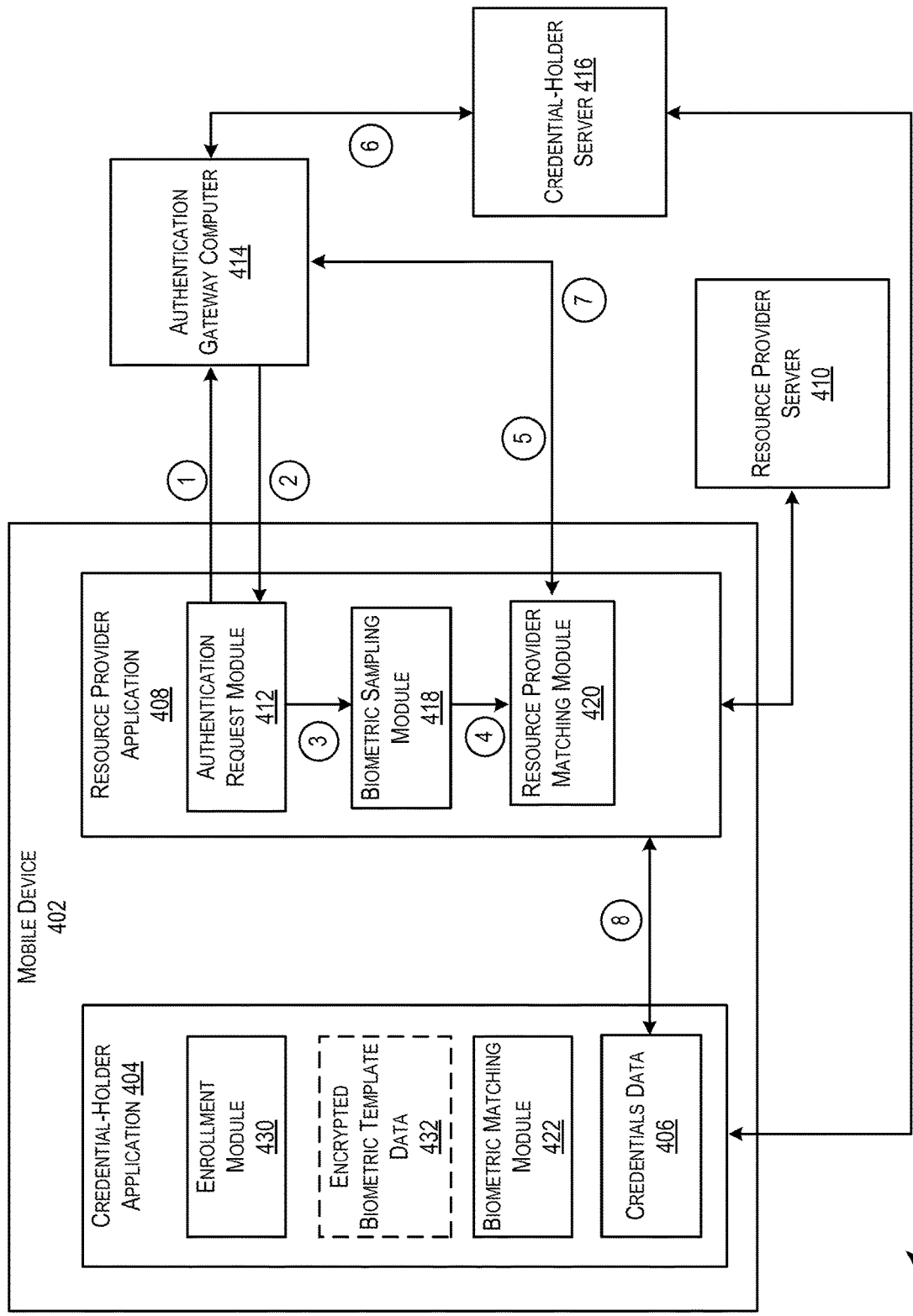
FIG. 4 shows an alternative process block diagram for securely authenticating a user at an application operating a user device, according to some embodiments.

FIG. 4 shows a process flow diagram for securely authenticating a user at a resource provider application according to embodiments. System 400 may comprise a mobile device 402 of a user. The mobile device 402 may be an example of the mobile device 302 of FIG. 3. The mobile device 402 may be any mobile electronic device such as a mobile phone, wearable device, laptop, tablet, etc. System 400 may further comprise a credential-holder application 404 for storing credentials of a user. The credential-holder application 404 may be an example of the authentication application 114 of FIG. 1 and/or the credential-holder applications 202 and 304 of FIGS. 2 and 3, respectively. In some embodiments, credential-holder application 404 may be a digital wallet application or mobile banking application that may store user credentials such as payment credentials or tokens that can be used for payment. In some embodiments, the user credentials may include biometric enrollment templates. In one embodiment, user credentials can be securely stored at credential-holder application 404 as credentials data 406, and can be retrieved by mobile device 402 to conduct a transaction.

In some embodiments, the enrollment process described above in connection with FIG. 2 has been conducted prior to the authentication process described with respect to FIG. 4. Accordingly, the credential-holder application 404 may have access to the encrypted biometric template data 432 which may include an encrypted biometric enrollment template generated during the enrollment process by the enrollment module 330 in the manner described in FIG. 2.

In the embodiment depicted in FIG. 4, mobile device 402 may comprise a resource provider application 408 (e.g., the resource provider application 116 of FIG. 1, the resource provider application 308 of FIG. 3). In one embodiment, the resource provider application 408 may be a mobile application that performs backend communications with a resource provider server 410 (e.g., the resource provider computer 104 of FIG. 1, the resource provider server 310 of FIG. 3, etc.). For example, the resource provider application 408 may be a mobile application provided to users by a merchant, such that the users may interact directly with the merchant from their mobile device 402. In another embodiment, the resource provider application 408 may be a website or web application that may connect to resource provider server 410. For example, the user may use a web browser of mobile device 402 to connect to a merchant website that provides the functionalities of resource provider application 408.

With reference to FIG. 4, a user may first initiate an authentication process for conducting a secure interaction on mobile device 402. For example, a checkout/purchase page of resource provider application 408 may provide/display a selection to the user, allowing the user to request authentication for a payment transaction using the enrolled biometric authentication program. Upon selection by the user, the request may be received by authentication request module 412 to initiate the authentication process represented by steps 1 through 8 shown.

At step 1, a user identifier may be retrieved from mobile device 402 and sent to authentication gateway computer 414 (e.g., the authentication gateway computer 120 of FIG. 1, the authentication gateway computer 314 of FIG. 3, etc.). For example, a device ID or network address may be retrieved from the resource provider application 408 or webpage. As another example, a user ID or account number can be entered into mobile device 402 and forwarded to authentication gateway computer 414. In embodiments, authentication gateway computer 414 may be a dedicated server for routing messages in carrying out the biometric authentication process. In one embodiment, communications between the resource provider application 408 and authentication gateway computer 414 may be accomplished through one or more application program interfaces (API). For example, the resource provider application 408 may submit an API call for submitting the user identifier to authentication gateway computer 414 and receiving an appropriate response.

At step 2, the authentication gateway computer 414 may receive the user identifier and may determine enrollment information for the user that can then be sent back to resource provider application 408. In one embodiment, the user enrollment information may comprise an indication of the user's enrollment (e.g. Yes or No), and one or more credential-holder identifiers. For example, the authentication gateway computer 414 may access enrollment information stored at the authentication gateway computer 414 (e.g., previously provided enrollment information provided by the credential-holder server 416) and/or the authentication gateway computer 414 may call out to the credential-holder server 416 to determine if the user identifier is associated with a credential holder identifier. The credential-holder server 416 may be further configured to determine if the user identifier is associated with an enrolled biometric template (e.g., a biometric enrollment template). If the user identifier is associated with an enrolled biometric template, the authentication gateway computer 414 may then retrieve any credential-holder identifiers associated with the user identifier, and may send the credential-holder identifiers and an indication of enrollment to resource provider application 408. For example, authentication gateway computer 414 may send an API response comprising an enrollment indication (e.g. 'enrolled=true') and one or more identifiers (e.g. wallet identifiers identifying one or more digital wallets storing credentials of the user).

At step 3, the resource provider application 408 may receive (e.g., via authentication request module 412) the user enrollment information, and may retrieve a biometric sample from the user. For example, the user enrollment information may comprise a positive indication of enrollment, which may initiate instructions of biometric sampling module 418. For example, the instructions may comprise code for prompting the user to provide a biometric sample via the mobile device 402. By way of example, the user may be prompted to take a self-portrait using a camera of the mobile device 402. The image data generated from the camera can then be used extract a biometric sample of the user's face. In other embodiments, other biometric reading devices such as microphones, fingerprint readers, etc. can be used by resource provider application 408 to retrieve a necessary biometric sample. Upon prompting by the resource provider application 408, the user may oblige to capturing his or her biometric sample, or may choose to cancel and terminate the authentication process.

At step 4, the successful capture of a biometric sample of the user may initiate a secure matching process. In embodiments, the secure matching process may be initiated and carried out using instructions of resource provider matching module 420. The instructions may comprise receiving the biometric sample of the user, generating a biometric template from the biometric sample, and encrypting the biometric template. For example, resource provider matching module 420 may comprise a biometric template derivation algorithm for extracting biometric features, and may comprise an encryption algorithm, for encrypting the biometric template data such that the extracted features may be obfuscated. Thus, in some examples, the resource provider matching module 420 may be configured to generate a biometric template from the biometric sample captured by the biometric sampling module 418. In some embodiments, the biometric template is encrypted by the resource provider matching module 420.

At step 5, the resource provider application 408 may retrieve the enrolled encrypted biometric template (e.g., the biometric enrollment template) from credential-holder server 416 for matching. In some embodiments, the encrypted biometric template data 432 is partially or entirely stored at the credential-holder server 416. In other embodiments, at least a portion of the encrypted biometric template data 432 is stored at the mobile device 402. At step 5, an API call may be sent to authentication gateway computer 414, which at step 6 may retrieve encrypted biometric template data 432 (e.g., the biometric enrollment template associated with the user/user identifier) from credential-holder server 416. At step 7, the authentication gateway computer 414 may submit the encrypted biometric template data 432 (e.g., including the biometric enrollment template) to the resource provider application 408. If a portion of the encrypted biometric template data 432 is stored at the mobile device 402, it should be appreciated that those portions of the enrolled encrypted biometric template (e.g., the biometric enrollment template) may be retrieved from the credential-holder application 404 and used for matching.

To protect the privacy of the user of mobile device 402 and his or her biometric data, matching of the encrypted biometric template data 432 (e.g., the encrypted biometric enrollment template) to the template generated at authentication may be performed using a cryptographic comparison protocol. The biometric matching module 422 may perform such cryptographic comparisons and/or the resource provider matching module 420 may be configured to perform these cryptographic comparisons. The cryptographic comparison protocol may allow for matching of the templates without transmitting any plaintext biometric data between credential-holder application 404, resource provider application 408, and/or credential-holder server 416. However, upon comparison, reliable information pertaining to the match result (match/no match) may be made available at all components of system 400. In embodiments, the cryptographic comparison may be accomplished by any one of: Secure Multi-Party Computation (SMPC), Homomorphic Encryption (HE), and/or Fuzzy Extractors (FE). More information regarding cryptographic comparison protocols can be found in International Patent Application Number: PCT/US17/24099 and International Patent Application Number: PCT/US16/58880, which are herein incorporated by reference in their entirety for all purposes. In addition, additional details relating to the cryptographic comparison protocols may also be described further below.

At step 8, if the comparison results in a positive match result (i.e. 'match=true'), then credentials data 406 may be retrieved and used to perform on or more operations such as, but not limited to, authorizing access to a resource provided by the resource provider. In another embodiment, the resource provider application 408 may further compare either of the encrypted biometric templates (e.g., the captured biometric template and/or the biometric enrollment template) to a photo stored at the resource provider application 408 as an additional security check. For example, the resource provider application may be a social media application that may be compare the biometric template generated at authentication to one or more photos of the user's social media profile.

Figure 5:
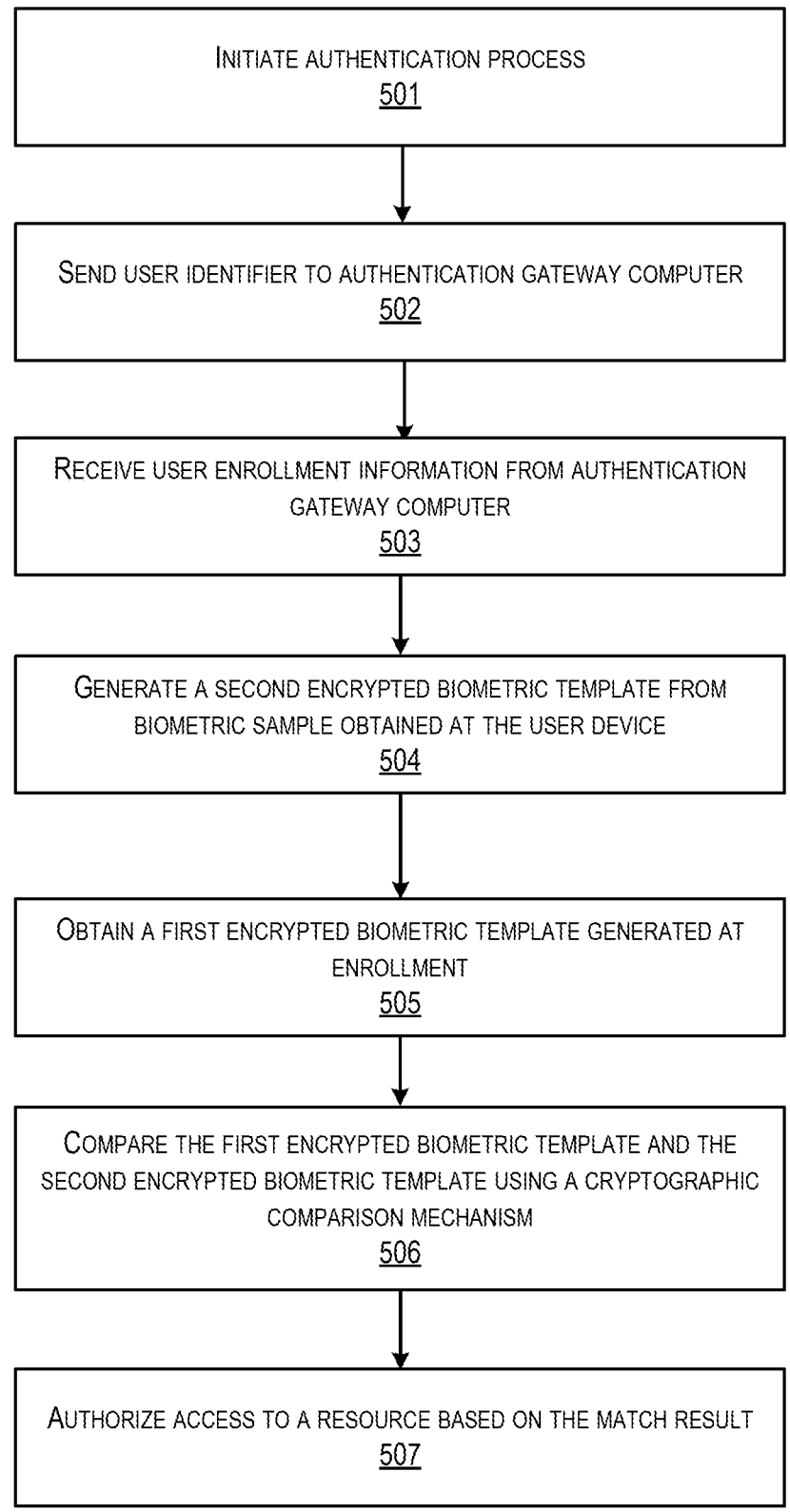
FIG. 5 shows a flowchart for a method for securely performing biometric authentication online, according to some embodiments.

FIG. 5 shows a flowchart for a method 500 for securely performing biometric authentication online according to an embodiment. At step 501, an authentication process may be initiated (e.g., by the mobile devices 302 and/or 402 of FIG. 3 or 4, respectively). For example, a "hands-free payment" option may be selected by a user during a transaction conducted using a merchant application (e.g., the resource provider application 308 and/or 408 of FIG. 3 or 4, respectively).

At step 502, a user identifier may be sent to an authentication provider. For example, an account ID may be auto-filled into a merchant application, where it can then be submitted to an authentication provider via an authentication gateway (e.g., the authentication gateway computers 314 or 414). The authentication provider may be associated with an entity with which the user has enrolled into a biometric authentication program, such as a mobile banking or payment processing entity. For example, in some embodiments, the authentication gateway may be provided by an entity associated with the credential-holder server 416, while in other embodiments, the authentication provider may be provided as part of, or on behalf of, an entity associated with the processing network computer 108 of FIG. 1.

At step 503, user enrollment information may be retrieved from the authentication provider. For example, a merchant application on the user's mobile device may receive an indication of enrollment and one or more identifiers (e.g., wallet identifiers) associated with the user's enrollment.

At step 504, if the user's enrollment has been confirmed, a second encrypted biometric template of the user may be generated. The second encrypted biometric template may be generated from a biometric sample captured by the mobile device (e.g., the mobile devices 302 or 402) during the authentication process. For example, a merchant application may access a camera function of the mobile device, and may prompt the user to take a picture of his or her face. Upon taking the picture, the merchant application may then extract features to generate a biometric template, and may encrypt the biometric template such that the features may be obfuscated. Similar processes may be utilized to generate an encrypted biometric template using other captured biometric data such as one or more iris scans, retina scans, audio voice recordings, fingerprint scans, hand print scans, and the like.

At step 505, a first encrypted biometric template generate at enrollment (also referred to herein as a biometric enrollment template) may retrieved. For example, a mobile banking application, digital wallet application, or servers thereof may send an encrypted biometric template (e.g., a biometric enrollment template) to a merchant application (e.g., resource provider applications 308 or 408) or merchant webpage running on the mobile device (e.g., mobile devices 302 or 402).

At step 506, the first and second encrypted biometric templates may be compared using a cryptographic comparison protocol, such that a match may be determined. For example, to perform a homomorphic encryption process, a merchant application (e.g., the resource provider application 308 or 408) may carry out a comparison in an encrypted domain and may send an encrypted match result back to a credential-holder (e.g. bank or digital wallet) application (e.g., the credential-holder application 304 or 404) or a credential-holder server (e.g., the credential-holder server 316 or 416) associated with the user's enrollment. The credential-holder application and/or server may then decrypt the match result and may notify the merchant application about the result, along with a proof (e.g., a digital signature or other proof mechanism) certifying that the credential-holder carried out the decryption faithfully.

In some embodiments, the credential-holder application or credential-holder server may comprise multiple one-time use encrypted biometric templates that can be used in a particular authentication process as the first encrypted biometric template (e.g., the encrypted biometric template generated during the enrollment process). In one embodiment, the first encrypted biometric template may be split into multiple parts between a credential-holder application on the mobile device and a credential-holder server according to a Shamir secret sharing scheme, and the parts may then be reconstituted for matching. In one embodiment, first encrypted biometric template may be split into multiple parts periodically, such that the parts may vary at different times. In yet another embodiment, the credential-holder application may generate encrypted biometric template components to store at the credential-holder server, with extra information (e.g. a seed) stored in a cookie on the mobile device. As such, the merchant application/web page can retrieve the cookie and use it together with the credential-holder server to carry out a comparison.

At step 507, the user may be authorized access to a resource based on the match result. For example, the merchant application may process a purchase conducted by the user if the user's first and second biometric templates match.

Figure 6:
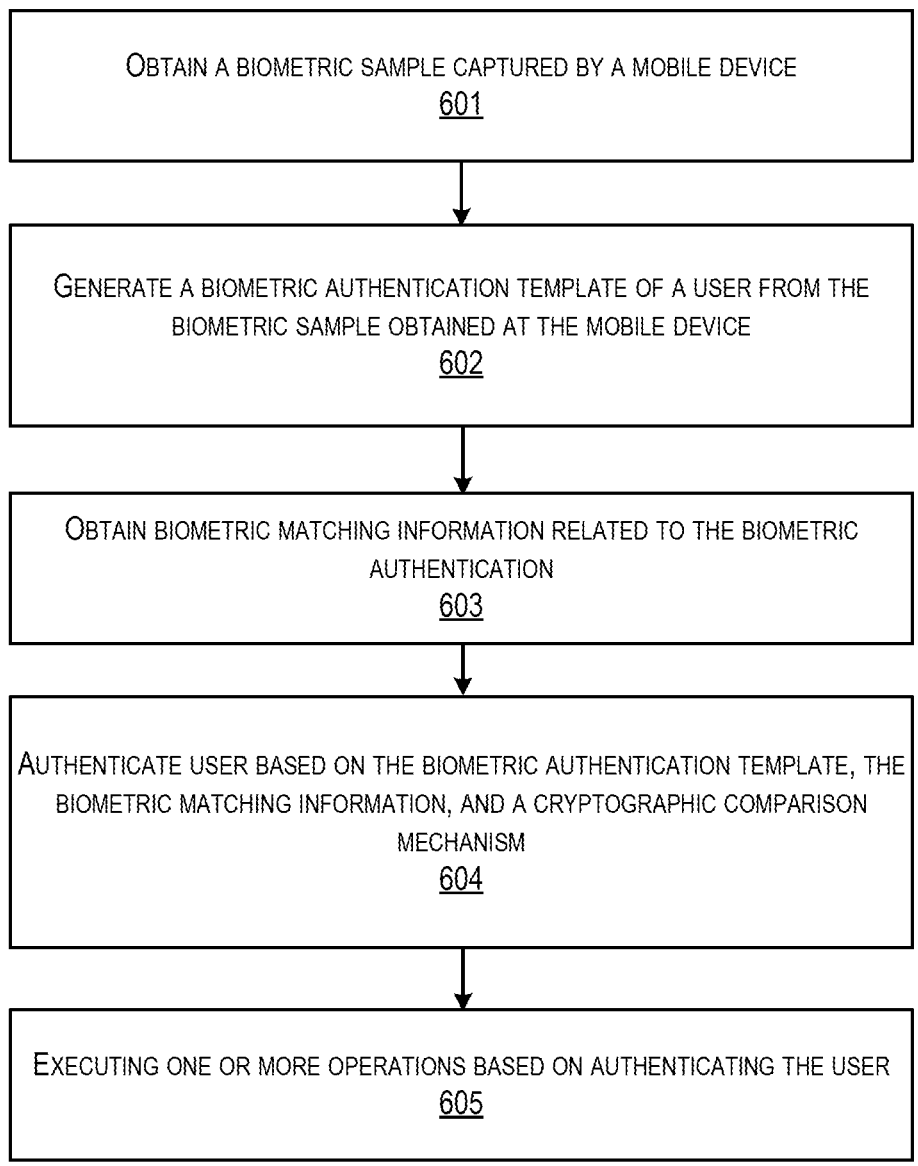
FIG. 6 shows a flowchart for another method for securely performing biometric authentication online, according to some embodiments.

FIG. 6 shows a flowchart for a method 600 for securely performing biometric authentication online according to an embodiment. At step 601, a biometric sample (e.g., one or more images, fingerprint scans, handprint scans, audio voice recordings, iris scans, retina scans, etc.) may be obtained. In some embodiments, the biometric sample may be captured by the mobile device (e.g., mobile devices 302 or 402 of FIG. 4, or my a user device such as user device 102 of FIG. 1) utilizing a corresponding feature of the device (e.g., a camera, a scanner, etc.) or a device that is accessible to the mobile device At step 602, a biometric authentication template may be generated from the biometric sample obtained by the mobile device. In some embodiments, the biometric authentication template may be generated after a determination is made that the user is enrolled in an authentication program as described above in connection with FIGS. 3 and 4. In some embodiments, a merchant application may access a camera function of the mobile device, and may prompt the user to take a picture of his or her face. Upon taking the picture, the merchant application may then extract features to generate a biometric template. In some embodiments, the merchant application may encrypt and/or obfuscate the biometric authentication template such that the features may be kept private. Similar processes may be utilized to encrypt the biometric authentication template using other types captured biometric samples such as one or more iris scans, retina scans, audio voice recordings, fingerprint scans, hand print scans, and the like.

At step 603, biometric information related to the biometric authentication template may be obtained. The biometric matching information may comprise a biometric enrollment template generated during an enrollment process and/or an obfuscated matching circuit configured to provide an output from which a match between two biometric templates is identifiable. For example, a mobile banking application, digital wallet application, or servers thereof may send a biometric enrollment template to a merchant application (e.g., resource provider applications 308 or 408) or merchant webpage running on the mobile device (e.g., mobile devices 302 or 402). In some embodiments, the biometric enrollment template may have been previously encrypted. In other embodiments, the mobile banking application, digital wallet application, or server thereof may send an obfuscated matching circuit that may be configured to generate an authentication result when the biometric authentication template is provided as input to the circuit. The authentication result may be utilized to identify whether or not the biometric authentication template matches a biometric enrollment template.

At step 604, the user may be authenticated based at least in part on the biometric authentication template, the biometric matching information, and a cryptographic comparison protocol. For example, to perform a homomorphic encryption process, a merchant application (e.g., the resource provider application 308 or 408) may carry out a comparison in an encrypted domain and may send an encrypted match result back to a credential-holder (e.g. bank or digital wallet) application (e.g., the credential-holder application 304 or 404) or a credential-holder server (e.g., the credential-holder server 316 or 416) associated with the user's enrollment. The credential-holder application and/or server may then decrypt the match result and may notify the merchant application about the result, along with a proof (e.g., a digital signature or other proof mechanism) certifying that the credential-holder carried out the decryption faithfully.

As another example, to authenticate the user utilizing SMPC, the merchant application (e.g., the resource provider application 308 or 408) may input the biometric authentication template in the obfuscated circuit (e.g., based on information received indicating how the gates of the circuit are connected) to generate an authentication result. The authentication result may be returned to the credential-holder application (e.g., the credential-holder application 304 or 416). The credential-holder application may then interpret the authentication result to determine whether the biometric authentication template matches a biometric enrollment template associated with the user.

In some embodiments, the credential-holder application or credential-holder server may comprise multiple one-time use encrypted biometric templates that can be used in a particular authentication process as the first encrypted biometric template (e.g., the encrypted biometric template generated during the enrollment process). In one embodiment, the first encrypted biometric template may be split into multiple parts between a credential-holder application on the mobile device and a credential-holder server according to a Shamir secret sharing scheme, and the parts may then be reconstituted for matching. In one embodiment, first encrypted biometric template may be split into multiple parts periodically, such that the parts may vary at different times. In yet another embodiment, the credential-holder application may generate encrypted biometric template components to store at the credential-holder server, with extra information (e.g. a seed) stored in a cookie on the mobile device. As such, the merchant application/web page can retrieve the cookie and use it together with the credential-holder server to carry out a comparison.

At step 605, one or more operations may be executed based on authenticating the user at 604. As a non-limiting example, the user may be provided access to a resource of the resource provider based on the match result. That is, the merchant application may process a purchase conducted by the user if the biometric authentication template captured during the authentication process matches the biometric enrollment template captured during the enrollment process.

Embodiments of the invention have a number of technical advantages. For example, unlike conventional authentication systems that utilize passwords, the systems and method herein detail a system that may utilize biometric data for authentication purposes. However, given the sensitive nature of biometric data, the user's inability to change such data, and the risk of exposing such sensitive data during an online transaction, the embodiments described herein provide improvements to securing this sensitive data. That is, embodiments of the invention ensure that only encrypted biometric data is passed between devices and that comparing two templates to determine a match utilizes encrypted and/or obfuscated biometric templates rather than unencrypted data. Thus, the authentication systems, devices, and methods herein utilize biometric data which is inherently more secure, but do so in a manner that provides improved data security over conventional authentication systems.

Any of the computing devices described herein may be an example of a computer system that may be used to implement any of the entities or components described above. The subsystems of such a computer system may be are interconnected via a system bus. Additional subsystems include a printer, keyboard, storage device, and monitor, which is coupled to display adapter. Peripherals and input/output (I/O) devices, which couple to I/O controller, can be connected to the computer system by any number of means known in the art, such as a serial port. For example, I/O port or external interface can be used to connect the computer apparatus to a wide area network such as the Internet, a mouse input device, or a scanner. The interconnection via system bus may allow the central processor to communicate with each subsystem and to control the execution of instructions from system memory or the storage device, as well as the exchange of information between subsystems. The system memory and/or the storage device may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
during an enrollment process using an authentication application on a mobile device, wherein the authentication application is in direct communication with an authentication computer:
initiating, by the authentication application on the mobile device, the enrollment process for enrolling a user in an authentication program;
capturing a biometric enrollment sample of the user using the mobile device;
generating, by the authentication application, a biometric enrollment template using the biometric enrollment sample of the user;
storing the biometric enrollment template locally or at the authentication computer;
informing, by the authentication application, the authentication computer of the biometric enrollment template;
during an authentication process initiated by a resource provider application on the mobile device, wherein the mobile device interacts directly with a resource provider via the resource provider application:
confirming, by the resource provider application on the mobile device, with an authentication gateway computer that the biometric enrollment template of the user is managed by the authentication computer via the authentication application, wherein the authentication gateway computer is in communication with the authentication computer;
obtaining, by the resource provider application on the mobile device, a biometric authentication sample from the user using the mobile device;
generating, by the resource provider application, a biometric authentication template of the user from the biometric authentication sample;
obtaining, by the resource provider application, biometric matching information related to the biometric authentication template, wherein the biometric matching information comprises the biometric enrollment template;
authenticating, by the resource provider application, the user of the mobile device based on the biometric authentication template, the biometric matching information, and a cryptographic comparison protocol, the cryptographic comparison protocol including one or more of: secure multi-party computation, homomorphic encryption, or a fuzzy extractor, the fuzzy extractor being configured to:
generate two cryptographic keys from the biometric authentication template and the biometric enrollment template and
use the two cryptographic keys to authenticate the user,
wherein the cryptographic comparison protocol of the resource provider application is configured to compare a first cryptographic key representing the biometric authentication template to a second cryptographic key representing the biometric enrollment template without retrieving the biometric enrollment sample of the user; and
authorizing, by the resource provider application, access to a resource provided by the resource provider in response to the user being authenticated.

2. The computer-implemented method of claim 1, wherein the biometric matching information comprises the biometric enrollment template, the biometric enrollment template being obtained from at least one of: the authentication application on the mobile device or from the authentication gateway computer.

3. The computer-implemented method of claim 1, further comprising:
initiating, by the resource provider application of the mobile device, the authentication process for authenticating the user of the mobile device;
sending, by the resource provider application, a user identifier to the authentication gateway computer;
receiving, by the resource provider application, user enrollment information from the authentication gateway computer, the user enrollment information comprising an indication of enrollment and one or more identifiers managed by the authentication computer.

4. The computer-implemented method of claim 3, wherein the biometric matching information comprises the biometric enrollment template or an obfuscated matching circuit configured to provide an output from which a match between two biometric templates is identifiable.

5. The computer-implemented method of claim 4, further comprising:
requesting, by the resource provider application from the authentication gateway computer, the biometric matching information, the biometric matching information comprising the biometric enrollment template; and
receiving, by the resource provider application, the biometric enrollment template from the authentication gateway computer.

6. The computer-implemented method of claim 3, further comprising:
generating, by the authentication application, the biometric matching information comprising the biometric enrollment template of the user from the biometric enrollment sample obtained by the mobile device during the enrollment process;
associating, by the authentication application, the biometric enrollment template of the user to at least one of: the user identifier or an identifier of the one or more identifiers managed by the authentication computer; and
storing, by the authentication application, the biometric enrollment template.

7. The computer-implemented method of claim 1, wherein the resource provider application operates on the mobile device and/or as an application on a web server.

8. A user device comprising:
one or more biometric capture devices;
one or more processors; and
one or more memories comprising computer-executable instructions, wherein executing the computer-executable instructions by the one or more processors causes the user device to:
during an enrollment process using an authentication application on the user device, wherein the authentication application is in direct communication with an authentication computer:
initiate, by the authentication application on the user device, the enrollment process for enrolling a user in an authentication program;
capture a biometric enrollment sample of the user using the user device;
generate, by the authentication application, a biometric enrollment template using the biometric enrollment sample of the user;
store the biometric enrollment template locally or at the authentication computer;

inform, by the authentication application, the authentication computer of the biometric enrollment template;

during an authentication process initiated by a resource provider application on the user device, wherein the user device interacts directly with a resource provider via the resource provider application:

confirm, by the resource provider application on the user device, with an authentication gateway computer that the biometric enrollment template of the user is managed by the authentication computer via the authentication application, wherein the authentication gateway computer is in communication with the authentication computer;

obtain, by the resource provider application operating on the user device, a biometric authentication sample from the user using the user device;

generate, by the resource provider application, a biometric authentication template from the biometric authentication sample;

obtain, by the resource provider application, biometric matching information related to the biometric authentication template wherein the biometric matching information comprises the biometric enrollment template;

authenticate, by the resource provider application, the user of the user device based on the biometric authentication template, the biometric matching information, and a cryptographic comparison protocol, the cryptographic comparison protocol including one or more of: secure multi-party computation, homomorphic encryption, or a fuzzy extractor, the fuzzy extractor being configured to:

generate two cryptographic keys from the biometric authentication template and the biometric enrollment template, and use the two cryptographic keys to authenticate the user, wherein the cryptographic comparison protocol of the resource provider application is configured to compare a first cryptographic key representing the biometric authentication template to a second cryptographic key representing the biometric enrollment template without retrieving the biometric enrollment sample of the user; and authorize, by the resource provider application, access to a resource provided by the resource provider in response to the user being authenticated.

9. The user device of claim 8, wherein the biometric matching information comprises the biometric enrollment template, the biometric enrollment template being obtained from at least one of: the authentication application on the user device or from the authentication gateway computer.

10. The user device of claim 8, wherein the one or more processors further cause the user device to:

initiate, by the resource provider application, the authentication process for authenticating the user of the user device;

send, by the resource provider application, a user identifier to the authentication gateway computer; and receive, by the resource provider application, user enrollment information from the authentication gateway computer, the user enrollment information comprising an indication of enrollment and one or more identifiers managed by the authentication computer.

11. The user device of claim 10, wherein the biometric matching information comprises the biometric enrollment template or an obfuscated matching circuit configured to provide an output from which a match between two biometric templates is identifiable.

12. The user device of claim 11, wherein executing the instructions by the one or more processors further causes the user device to:

request, by the resource provider application from the authentication gateway computer, the biometric matching information, the biometric matching information comprising the biometric enrollment template; and receive, by the resource provider application, the biometric enrollment template from the authentication gateway computer.

13. The user device of claim 10, wherein executing the instructions by the one or more processors further causes the user device to:

generating, by the authentication application, the biometric matching information comprising the biometric enrollment template of the user from the biometric enrollment sample obtained by the user device during the enrollment process;

associating, by the authentication application, the biometric enrollment template of the user to at least one of: the user identifier or an identifier of the one or more identifiers managed by the authentication computer; and storing, by the authentication application, the biometric enrollment template.

14. The user device of claim 8, wherein the resource provider application operates on the user device or as an application on a web server.

* * * * *